(12) United States Patent
Shah et al.

(10) Patent No.: US 8,818,345 B1
(45) Date of Patent: Aug. 26, 2014

(54) ENHANCING CONFERENCE BRIDGE MUTING TO SAVE NETWORK RESOURCES

(75) Inventors: Maulik K. Shah, Overland Park, KS (US); Srinivasarao Venkata Naga Satya Penugonda, Overland Park, KS (US); Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 30 days.

(21) Appl. No.: 13/448,984

(22) Filed: Apr. 17, 2012

(51) Int. Cl.
*H04M 3/42* (2006.01)

(52) U.S. Cl.
USPC ............ 455/416; 709/204; 709/205; 709/206

(58) Field of Classification Search
CPC .................. H04M 2201/50; H04M 2203/4509; H04M 2215/7009; H04M 3/42127; H04M 7/006; H04M 68/00; H04M 4/00; G05F 2009/00; G05F 2015/00
USPC ................................... 455/416; 709/204–206
See application file for complete search history.

(56) References Cited

U.S. PATENT DOCUMENTS

| 8,005,075 | B1* | 8/2011 | Webster et al. ............... 370/352 |
|---|---|---|---|
| 2004/0179513 | A1* | 9/2004 | Smith et al. ................... 370/352 |
| 2004/0185855 | A1* | 9/2004 | Storm et al. .................. 455/445 |
| 2005/0213739 | A1* | 9/2005 | Rodman et al. .......... 379/202.01 |
| 2006/0114884 | A1* | 6/2006 | Remaker ....................... 370/352 |
| 2007/0263805 | A1* | 11/2007 | McDonald ................. 379/93.26 |
| 2008/0037751 | A1* | 2/2008 | Aldrey et al. ............ 379/202.01 |
| 2009/0264114 | A1* | 10/2009 | Virolainen et al. ........... 455/416 |
| 2010/0260086 | A1* | 10/2010 | Santhanam et al. .......... 370/311 |
| 2011/0112831 | A1* | 5/2011 | Sorensen et al. .............. 704/226 |
| 2011/0249073 | A1* | 10/2011 | Cranfill et al. ............. 348/14.02 |
| 2012/0140681 | A1* | 6/2012 | Kaminsky et al. ............ 370/261 |
| 2012/0154509 | A1* | 6/2012 | Erb ........................... 348/14.03 |
| 2013/0051543 | A1* | 2/2013 | McDysan et al. ........ 379/202.01 |

* cited by examiner

*Primary Examiner* — Charles Appiah
*Assistant Examiner* — Edward Zhang

(57) ABSTRACT

Systems, methods, and computer-readable media are provided for reducing the use of network resources during a conference call with mobile communications devices. An active conference call is detected between a conference bridge service, including a conference bridge leader, and participants who are ace sing the conference call by way of a mobile communications device in a wireless communications network. An indication is received that the conference bridge leader has muted the lines of the participants. As a result, each of these mobile communications devices are notified to stop transmitting data over a reverse link other than data used for signaling purposes until the devices are no longer muted.

18 Claims, 4 Drawing Sheets

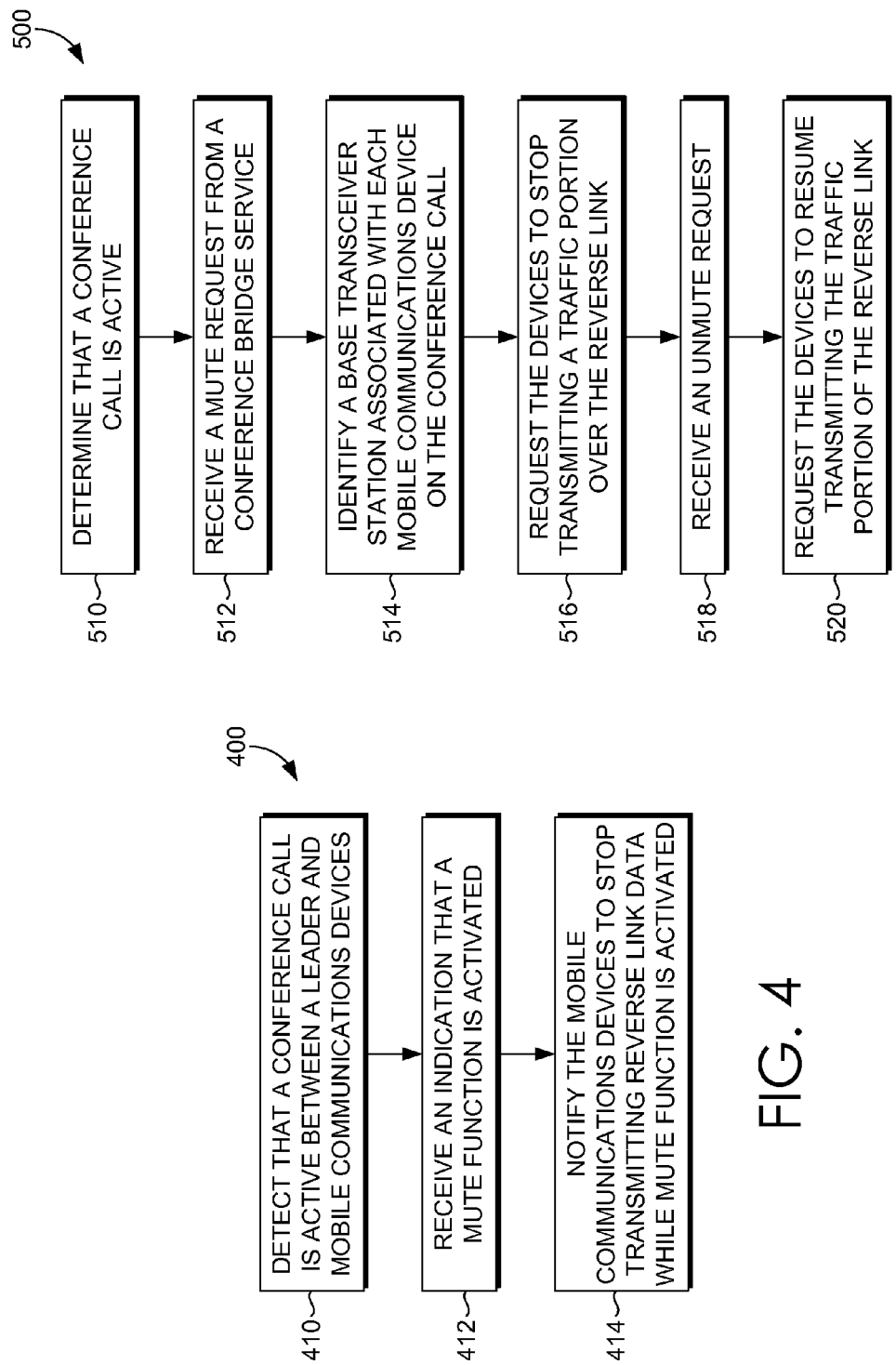

ENHANCING CONFERENCE BRIDGE MUTING TO SAVE NETWORK RESOURCES

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, methods for conserving network resources when mobile devices participate in a conference call with a conference bridge service. As typically participants do not actively participate in at least a portion of a conference call, such as if there is a speaker giving a presentation, the resources used on the forward link from each mobile device to the wireless communications network are essentially wasted. Embodiments of the present invention allow for mobile devices to stop transmitting data over the traffic portion of the reverse link during a conference call or some other call when a mute function has been activated. In one instance, the mute function is activated by the conference bridge leader. The savings of network resources can be highly beneficial to a service provider by ceasing the transmission of data, other than signaling data, over the reverse link.

BRIEF DESCRIPTION OF THE DRAWINGS

Illustrative embodiments of the present invention are described in detail below with reference to the attached drawing figures, and wherein:

FIGS. 4 and 5 are flow charts of methods for reducing the use of network resources during a conference call, in accordance with embodiments of the present invention.

DETAILED DESCRIPTION

Figure 1:
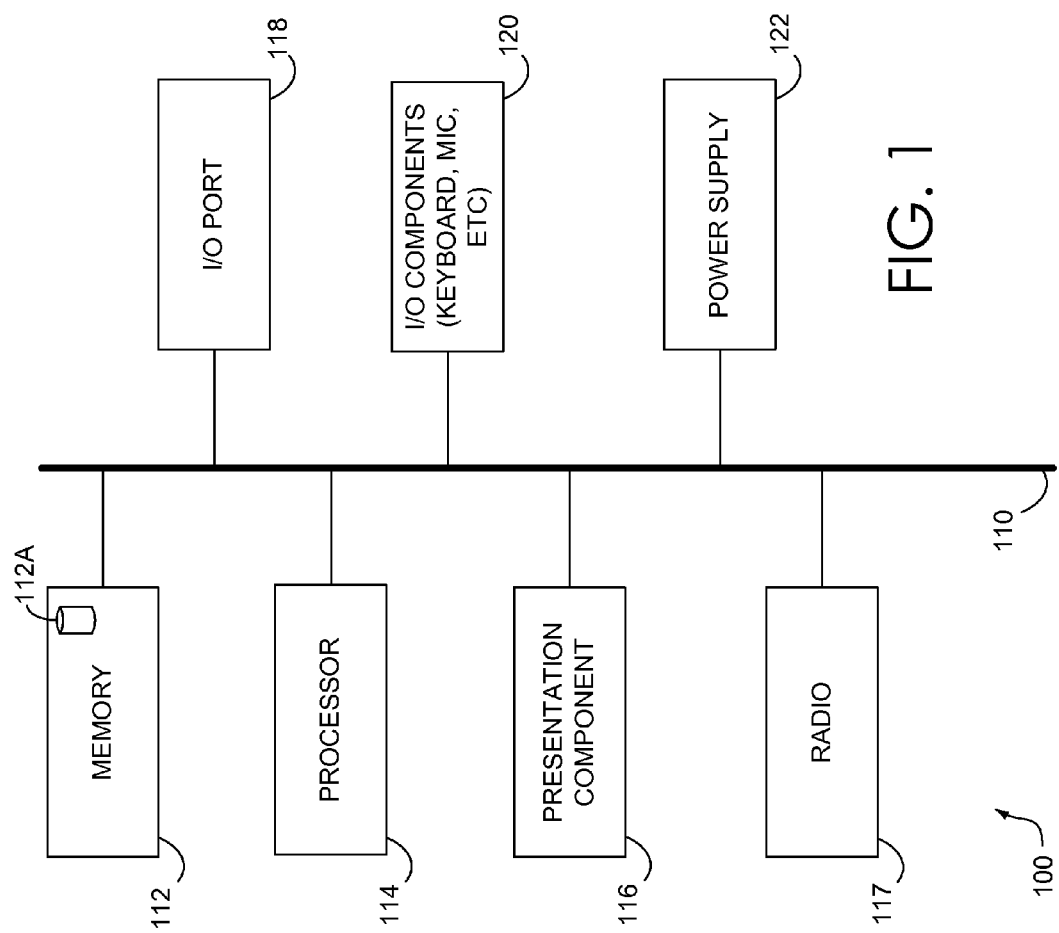
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for conserving network resources on the reverse link during a conference call when one or more participants using mobile devices are muted. While traditionally mobile devices that are muted still transmit data on the reverse link (e.g., blank frames), embodiments of the present invention allow for the mobile devices that are muted to stop transmitting data on the reverse link other than for signaling purposes. In one instance, the conference bridge leader initiates the mute request for some or all of the mobile devices on the conference call. Various network components, including the base station controller and base transceiver station associated with a particular mobile device are involved in the process of altering a timer so that the mobile device is not disconnected from the conference call and notifying the mobile device when to stop and restart transmitting data over the reverse link, which extends from the mobile device through the wireless communications component. A similar process occurs when the conference bridge leader decides to initiate an unmute request for these mobile devices. The mobile devices are then notified to restart transmitting data over the reverse link, which allows these participants to participate in the conference call by transmitting audio to the conference call.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Technology |
| 4G | Fourth-Generation Cellular Communication System |
| BSC | Base Station Controller |
| BTS | Base Transceiver Station |
| CD-ROM | Compact Disk Read Only Memory |
| CDMA | Code Division Multiple Access |
| GPRS | General Packet Radio Service |
| GSM | Global System for Mobile communications: originally from Groupe Spécial Mobile |
| DVD | Digital Versatile Discs |
| EEPROM | Electrically Erasable Programmable Read Only Memory |
| ESN | Electronic Serial Number |
| EVDO | Evolution Data Optimized |
| LED | Light Emitting Diode |
| LTE | Long Term Evolution |
| PC | Personal Computer |
| PCS | Personal Communications Service |
| PDA | Personal Digital Assistant |
| PSTN | Public Switched Telephone Network |
| RAM | Random Access Memory |
| ROM | Read Only Memory |
| TDMA | Time Division Multiple Access |
| UMTS | Universal Mobile Telecommunications Systems |

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Accordingly, in one aspect, the present invention is directed to computer-readable media having computer-executable instructions embodied thereon that, when executed, perform a method for reducing the use of network resources during a conference call. The method includes detecting that a conference bridge service is currently active between a conference bridge leader and one or more participants who access the conference bridge service by way of mobile communications devices in a wireless communications network. The method further comprises receiving an indication that the conference bridge leader has activated a mute function for each of the one or more participants on the conference call. Additionally, the method includes notifying each of the mobile communications devices associated with the one or more participants to stop transmitting data over a reverse link other than the data used for signaling purposes for a period of time that extends until the mute function is deactivated.

In another aspect, embodiments of the present invention are directed to Computer-readable media having computer-executable instructions embodied thereon that, when executed, perform a method for reducing the use of network resources during a conference call. The method includes determining that the conference call is currently active between a conference bridge service and one or more mobile communications devices in a wireless communications network, and in an existing voice link between a base station controller in the wireless communications network and the conference bridge service, receiving a mute request from the conference bridge service to mute the one or more mobile communications devices participating on the conference call. Further, the method includes using an identification associated with each of the one or more mobile communications devices to identify a base transceiver station associated with the each of the one or more mobile communications devices. The method also includes requesting that each of the base transceiver stations notify the associated one or more mobile communications devices to stop transmitting a traffic portion of a reverse link from the one or more mobile communications devices to the wireless communications network but continue transmitting a signaling portion of the reverse link to save network resources. Additionally, the method includes receiving an unmute request with respect to the one or more mobile communications devices and in response to the unmute request, requesting that the base transceiver stations notify their associated one or more mobile communications devices to resume transmitting the traffic portion of the reverse link.

In yet another aspect, embodiments of the present invention are directed to A system for reducing the use of network resources during a conference call. The system includes a base station controller that receives a mute request from a conference bridge service in relation to the conference call between a conference leader and one or more mobile communications devices, the mute request requesting that each of the one or more mobile communications devices not provide any audio to the conference call. The base station controller alters a timer associated with a reverse link between a wireless communications network and the one or more mobile communications devices such that the conference call is not terminated when the wireless communications network detects that data is not being transmitted over the reverse link. Further, the system includes at least one base transceiver station that receives the mute request from the base station controller and notifies at least one of the one or more mobile communications devices with which it is associated to stop transmitting a traffic portion of a reverse link from the at least one of the one or more mobile communications devices to the wireless communications network but continue transmitting a signaling portion of the reverse link to save network resources. The system also includes one or more mobile communications devices that, upon receiving a notification from the associated base transceiver station to stop transmitting the traffic portion of the reverse link, refrain from transmitting any data associated with the traffic portion of the reverse link but continue transmitting a signaling portion of the reverse link until the associated base transceiver station provides a notification to resume transmitting the traffic portion of the reverse link.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 112A that, when executed, facilitate various aspects disclosed herein. These embodied instructions will variously be referred to as "instructions" or an "application" for short. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
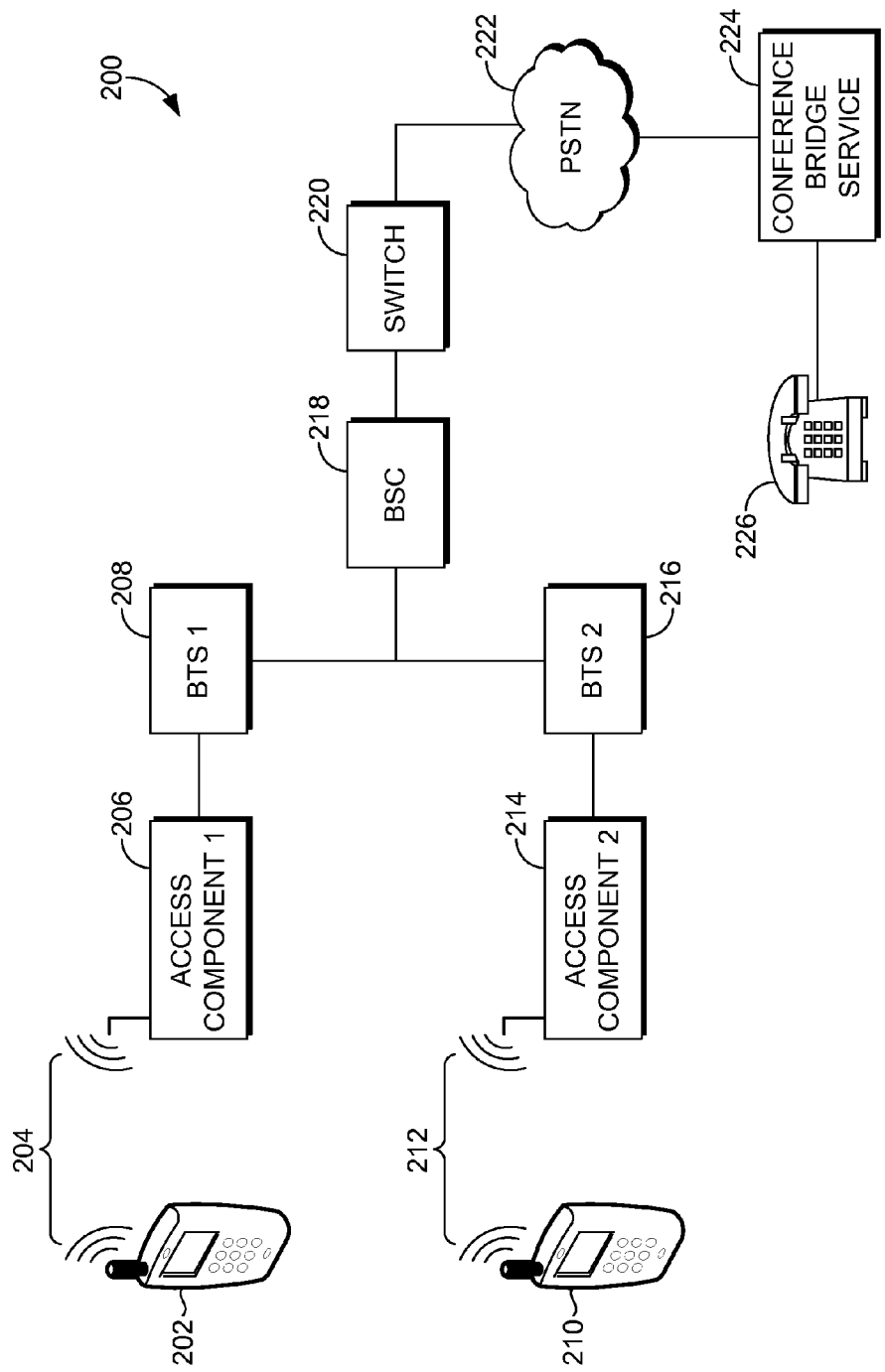
FIG. 2 is a schematic view of an exemplary communications environment suitable for use in implementing embodiments of the present invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Mobile devices 202 and 210 are the type of device described in connection with FIG. 1 in one embodiment. Mobile devices 202 and 210 may each be, for example, a personal computer (PC), a laptop computer, a tablet, a mobile phone, a personal digital assistant (PDA), a server, or any other device that is cable of communicating with other devices. A device such as those mentioned above may include, for example, a display(s), a power source(s) (e.g., a battery), a data store(s), a speaker(s), memory, a buffer(s), and the like. In embodiments, the mobile devices comprise a wireless or mobile device with which a wireless telecommunications network is utilized for communication. In this regard, the mobile device communicates with other devices using a wireless telecommunications network(s).

Mobile devices 202 and 210 communicate with their respective access component 206 or 214 by way of a communications link 204 or 212. Each of communications links 204 and 212 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (e.g., a primary connection and a secondary connection). A short-range connection may include a Wi-Fi® connection to a device (i.e., mobile hotspot) that provides access to a wireless communications network, such as a WLAN connection using 802.11 protocol. A long-range connection may include a connection using one or more of CDMA, GPRS, GSM, TDMA, and 802.16.

Generally, each access component 206 and 214 provides access to what some skilled artisans refer to as a wireless communications network, also termed a core network, illustrated in FIG. 2 by a combination of one or more of the illustrated components. A wireless communications network may comprise one or more of the components illustrated in FIG. 2. To the contrary, not all components that make up a wireless communications network are shown. Also, not all connections or possible connections are shown. Each access component 206 and 214 may be one or more of a base transceiver station (BTS) tower, a Wireless access component, a Mobile Hotspot, and any other device that facilitates communication between mobile devices 202 and 210 and the network. In one embodiment, each access component 206 and 214 includes both a Wireless access component and a BTS tower. In another embodiment, each access component 206 and 214 is a BTS tower. Each access component 206 and 214 communicates with a BTS, BTS 1 (208) or BTS 2 (216), respectively. Each of BTS 1 (208) and BTS 2 (216) is a piece of equipment that facilitates wireless communication between the mobile devices 202 and 210 and the network. Using embodiments of the present invention, the BTS is able to receive instructions from other network components and is responsible for communicating with its respective mobile device(s) as to whether or not the mobile device is to be sending data over the network on the reverse link. The BTSs may also handle the traffic channels for the mobile devices by informing them to stop or restart transmitting the traffic portion of the reverse link. While two BTSs are illustrated in FIG. 2, there may be any number of BTSs in a wireless communications network that may contribute to embodiments of the present invention.

A base station controller (BSC) 218 is also shown in FIG. 2. The BSC 218 acts as the intelligence behind base transceiver stations (BTS) and handles allocation of radio channels, receives measurements from mobile devices, and controls handovers from one BTS to another BTS. The BSC 218, using embodiments of the present invention, interacts directly with the BTSs. The BSC 218 informs the BTSs when they are to stop transmitting data over the reverse link and when they are to continue transmitting data over the reverse link. In one embodiment, this data comprises the traffic portion of the reverse link but excludes the signaling portion such that signaling messages are still communicated over the reverse link. The BSC 218 may also be responsible for altering a time, sometimes called the reverse link fade timer to ensure it does not perceive the current call as a call whose reverse link has been lost, thus resulting in a dropped call for the user. The timer is altered by the BSC 218, in one embodiment, when a mute function is activated. The mute function will be described herein in more detail, but generally it may be activated by a conference bridge service, such as by the conference bridge leader, or by the user of a mobile device participating in a conference call with the conference bridge service. While one BSC is illustrated in FIG. 2, there are likely multiple BSCs in a particular wireless communications network that may contribute to embodiments of the present invention.

Other components illustrated in FIG. 2 include a switch 220, a public switched telephone network (PSTN) 222, a conference bridge service 224, and a communications device 226 associated with a particular conference call that utilizes the conference bridge service 224. As mentioned, other components not shown here may also be used to carry out aspects of the present invention. Further, several components shown in FIG. 2 may be combined into a single component although shown separately in FIG. 2. The switch 220, in one embodiment, is associated with the particular wireless communications network handling the conference call. The switch 220 receives the mute request from the PSTN 222 and acts mainly as a router, routing the message to the appropriate BSC, such as BSC 218. The PSTN 222 similarly acts as a router, receiving the mute request from the conference bridge service 224, and determines which switch(es) to which the mute request should be routed, based on the identifications (e.g., mobile device numbers) of the mobile devices that are to be muted for a period of time during a conference call. Generally, the PSTN 222 is the network of the world's public circuit-switched telephone networks and consists of telephone lines, fiber optic cables, microwave transmission links, cellular networks, communications satellites, and undersea telephone cables, all inter-connected by switching centers, thereby allowing any telephone in the world to communicate with any other telephone.

In one embodiment of the present invention, components of a wireless communications network detect and interact with the conference bridge service 224 and identify the activation of a mute function. Once this event has been detected, switch 220 within the wireless communications network interacts with other network components, such as the BSC 218 and the BTS 1 (208) and BTS 2 (216), which are responsible for instructing the mobile device(s) in that network that are participating in the particular conference call to tear off its reverse traffic channel, resulting in an increase of reverse link capacity. Typically, wireless calls include both a reverse link and a forward link. The forward link is the link from a fixed location, such as a network, to a mobile device. The reverse link is the link from the mobile device to a fixed point on the network, such as the base station. As such, using embodiments of the present invention, the network notifies the mobile devices participating on a conference call that has been muted to stop transmitting the data or traffic portion of the reverse link, thus effectively tearing down a portion of the reverse link to save network resources. Otherwise, the mobile device would continue sending blank frames to the network, utilizing unnecessary resources.

To provide further explanation, the following provides an exemplary scenario that encompasses various aspects of the present invention. Initially, the conference bridge service 224 sends a special message through the PSTN 222 to the switch 220 indicating a mute function is activated, which essentially indicates that the conference bridge service 224 wishes to mute the bridge for some or all participants. This message may include an indication of the mute function activation and a list of phone numbers needing to be muted. The message, in one embodiment, is in the form of an SMS message. Once the switch 220 has this information, it communicates with the associated BSCs, such as BSC 218, that are handling the RF communication for that call. The BSC 218 then interacts with the appropriate BTSs, such as BTS 1 (208) and BTS 2 (216) handling the traffic channels for the destination mobile devices, informing them to stop transmitting data over the reverse link except for signaling purposes (e.g., power control, signal quality). The BSC 218 also alters the timer associated with the reverse link to ensure it does not perceive the current conference call as a call whose reverse link has been lost, resulting in a dropped call. Typically, the timer is set for a certain predetermined amount of time, and if there is no reverse link activity, at least from the traffic portion of the reverse link, for that period of time, the call may be dropped by the network.

In response, the mobile devices 202 and 210 stop transmitting the traffic portion of the reverse link except for signaling purposes. As used herein, the traffic portion of the reverse link refers to data sent by a mobile communication device, including frames and packets of data, other than data used for signaling. The signaling portion, as such, includes items such as messages to handover a call to a different base transceiver station, messages regarding a quality of a forward link, messages notifying the wireless communications network to power up or power down, and the like. When the conference bridge service 224 wishes to deactivate the mute function, thus releasing the mobile devices from being on mute for the conference call, the switch 220 may indicate this activity to the BSC 218, which forwards it to the BTSs. BTS 1 (208) and BTS 2 (216) would then communicate to their respective mobile devices that were previously on mute that they can continue to transmit data on the traffic portion of the reverse link, if the "mute" button on the mobile device is not active. In another embodiment, the mobile device 202 or 210 may initiate the unmute request, and the mobile device would then be able to transmit data on the traffic portion of the reverse link. In order to avoid disturbances to the conference bridge, the mobile device may also monitor if there is some voice or other audio activity on the forward link so that the mobile device would be provided with an indication (e.g., beeping, vibrating) if the user is trying to send reverse link traffic packets. Further, if the mobile device initiates the unmute request or deactivates the mute function, the user may be sent a confirmation message on the mobile device confirming that the user does wish to unmute the line, thus resuming the transmission of data on the traffic portion of the reverse link and allowing others on the conference call to hear the user.

Figure 3:
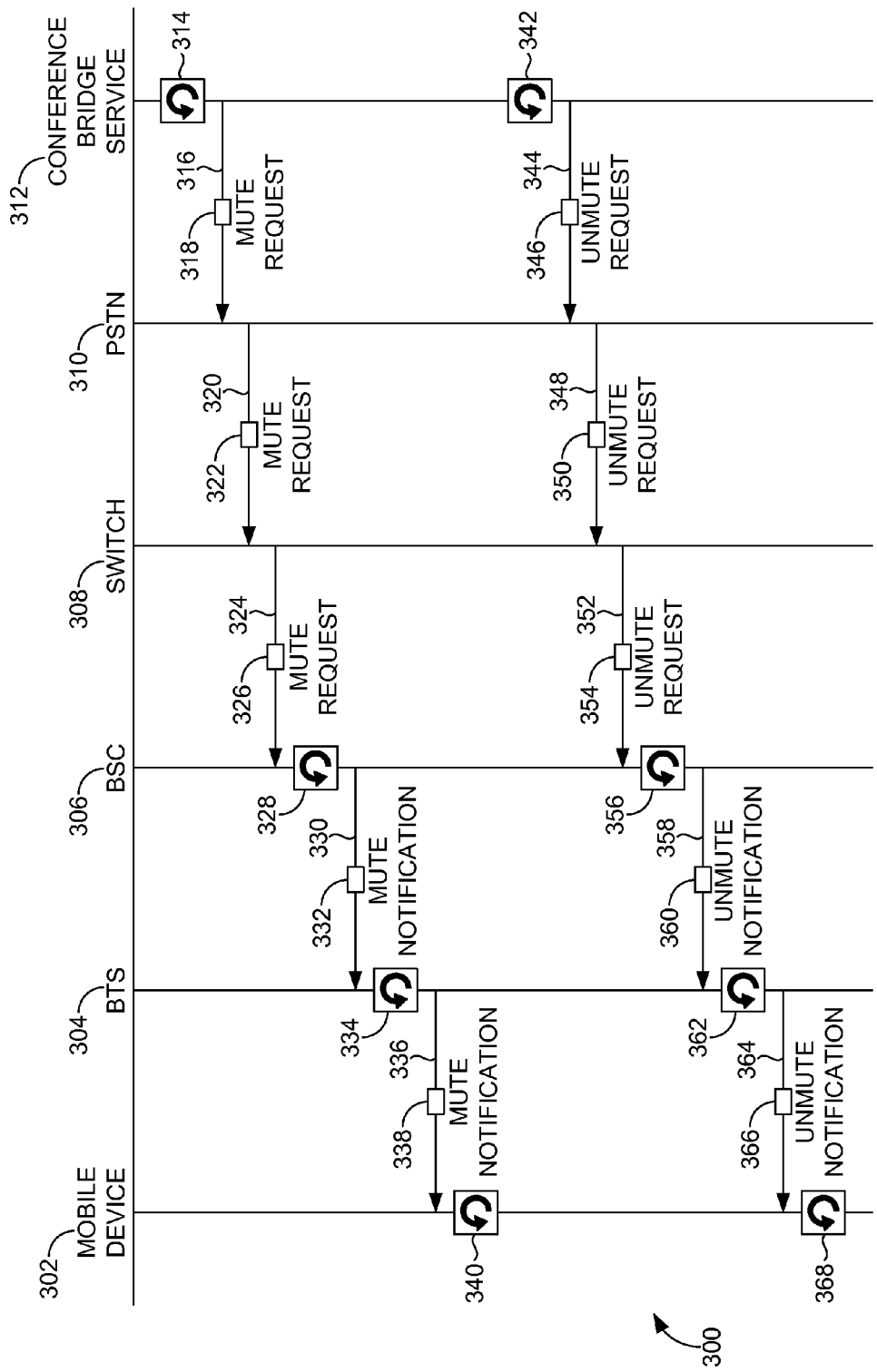
FIG. 3 is a flow diagram of an exemplary method for processing a mute request and an unmute request, in accordance with an embodiment of the present invention.

Turning now to FIG. 3, a flow diagram 300 is shown of an exemplary method for processing a mute request and an unmute request, in accordance with an embodiment of the present invention. Various components are depicted in FIG. 3, including a mobile device 302, a BTS 304, a BSC 306, a switch 308, a PSTN 310, and a conference bridge service 312. While one of each of these components is depicted in FIG. 3, the inclusion of more than one of each component is considered to be within the scope of the present invention. For example, while one mobile device 302 is shown, multiple mobile devices would likely be included in embodiments of the present invention, meaning that there would also likely be more than one BTS, and perhaps multiple BSCs and switches, as there typically are in a service provider's network.

Initially, the conference bridge service 312, or a conference leader associated with a particular conference call, decides that it would like to mute one or more of the mobile devices participating on the conference call so that the conference leader and other participants are unable to hear any audio from those one or more mobile devices. This is depicted at step 314. It should be noted that prior to step 314, the mobile device 302 has dialed into a telephone number associated with the conference bridge service 312 and the components shown here, in addition to others, have connected the mobile device 302 to the conference bridge service 312, which includes setting up a forward and reverse link so that the mobile device 302 can communicate audio with the conference bridge service 312 and so that the mobile device 302 can receive audio from the conference bridge service 312. The conference bridge service 312 communicates 316 a mute request 318 to the PSTN 310, which acts as a routing component such that it determines which switch the mute request is to be forwarded to and routes 320 the mute request 322 to the switch 308. In one embodiment, because the call has already been set up from the mobile device 302 to the conference bridge service 312, the PSTN 310 already knows which switch to which the mute request 322 is to be routed. The switch 308 similarly knows which BSC 306 to which the mute request is to be routed, and as such communicates 324 the mute request 326 to the BSC 306.

At step 328, the BSC 306, which contains additional logic to perform embodiments of the present invention, performs a role of mobility management. The BSC 306 knows which BTS is associated with the mobile device. At step 328, the BSC 306 alters the time, sometimes called the reverse link fade timer, to ensure that it does not perceive this particular call as a call whose reverse link has been lost, resulting in a dropped call. This timer is in place to detect when no frames, even blank frames, are being transmitted from a mobile device. In this instance, the timer would need to be altered so that the call is not dropped, as the mobile device will be directed to stop communicating any data, other than for signaling purposes, over the reverse link. The BSC 306 then communicates 330 a mute notification 332 to the BTS 304. The mute notification 332 indicates to the BTS 304 that the BTS 304 needs to notify the mobile device 302 to stop transmitting data, other than for signaling purposes, over the reverse link. The BTS 304, also including additional logic, determines at step 334 that it needs to notify a particular mobile device to stop transmitting data over the reverse link. The BTS 304 communicates 336 the mute notification 338 to the mobile device 302 indicating that the mobile device 302 has been muted on the conference call and that the traffic portion of the reverse link is to be torn down such that data on the traffic portion is not to be sent from the mobile device 302. The mobile device, at step 340, discontinues transmitting any data over the reverse link other than signaling data. As such, a portion of the reverse link (e.g., traffic portion) is effectively torn down at this time. Normally, blank frames would be transmitted while the mobile device 302 is muted, but using embodiments of the present invention, blank frames are no longer transmitted over the reverse link while the mobile device 302 is muted. While the embodiment of FIG. 3 is applicable to a conference call and to the conference bridge service 312 initiating and activating the mute function, other embodiments may not require a conference call, but instead may be a one-to-one call between two mobile devices, for example, or even a call that is not considered to be a conference call and that does not include a conference bridge service 312 but that involves multiple participants. Further, in an embodiment, the mute function may be activated by one of the mobile devices instead of the conference bridge service 312.

Once the mobile device 302 has been muted by the conference bridge service 312, a period of time elapses until the conference bridge service 312 determines, at step 342, that it would like to deactivate the mute request, or unmute one or more of the mobile devices participating on the conference call. Typically, this would occur near or at the end of the conference call, such as when questions are taken by the conference leader or when the conference call is over. If the conference bridge service 312 does not unmute the line, the conference call may be terminated without the mobile devices being unmuted. The conference bridge service 312 communicates 344 an unmute request 346 to the PSTN 310, which forwards 348 the unmute request 350 to the switch 308, which forwards 352 the unmute request 354 to the appropriate BSC, here BSC 306. The BSC 306 once again alters the timer in anticipation of the mobile device 302 once again transmitting data over the reverse link, shown at step 356. The timer is altered, in one embodiment, back to its original settings, such that the call would be dropped if data is not transmitted from the mobile device 302 within a predetermined amount of time. The BSC 306 then communicates 358 the unmute notification 360 to the BTS 304 indicating that the BTS 304 is to notify the mobile device 302 to restart transmitting data over the reverse link. At step 362, the BTS 304 determines which mobile device it is to notify, and communicates 364 the unmute notification 366 to the mobile device 302. At step 368, the mobile device 302 once again is able to continue transmitting data over the traffic portion of the reverse link.

FIG. 4 is a flow chart of a method 400 for reducing the use of network resources during a conference call, in accordance with an embodiment of the present invention. Initially at step 410, it is detected that a conference call is currently active between a conference bridge leader and one or more mobile communications devices. For the conference call to be active, the conference bridge service hosting the call is also determined to be active. The mobile communications devices are participants on the conference call and communicate by way of a wireless communications network. At step 412, an indication is received, such as at the BSC, that a mute function is activated. In one embodiment, the conference bridge leader at the conference bridge service has activated the mute function for one or more participants on the conference call. In one instance, all of the participants are muted, but in another instance, less then all of the participants are muted. For example, there may be one or more participants who are interactively involved on the conference call, and they would not want to be muted. While here the mute function is activated by the conference bridge leader at the conference bridge service, in another embodiment, the user of the mobile device may be the one to activate the mute function, which would result in the mobile device not transmitting data over the traffic portion of the reverse link until the mute function is deactivated. The mobile communications devices that are to be muted are notified at step 414 to stop transmitting reverse link data while the mute function is activated, which may be until they are notified otherwise. Data for signaling purposes, however, may still be transmitted during the period of time that the mobile device is muted. The data that the mobile communications devices stop transmitting may be considered data of the traffic portion of the reverse link to prevent blank frames from being unnecessarily transmitted over the reverse link, which utilizes network resources.

As mentioned above, the BSC may be responsible for altering a time associated with the reverse link such that the conference call is not terminated when the wireless communications network detects that data is no longer being transmitted over the reverse link. The entire conference call may not be terminated, but the call from the mobile device's perspective is terminated such that the other participants are still connected to the conference bridge service.

In one embodiment, the wireless communications network, such as the BSC may detect that one of the mobile communications devices that has been previously muted is transmitting data over the traffic portion of the reverse link. This may indicate that an unmute action has been initiated by that mobile device. In this instance, the mobile communications device may be sent a confirmation message, such as in the form of an SMS message or other type of text message to confirm with the user that the user wishes to unmute the line. If the user confirms this action, the user may then be able to communicate audio to the conference call. One instance where this may occur is if the user wishes to ask a question or comment on the subject matter of the conference call. Alternatively, an indication may be received that the conference bridge leader has activated an unmute function, or deactivated the mute function for each of the participants on the conference call. In response to this, the mobile communications devices are notified to resume transmitting data on the traffic portion of the reverse link.

Referring now to FIG. 5, a flow chart is illustrated of a method 500 for reducing the user of network resources during a conference call, in accordance with an embodiment of the present invention. At step 510, it is determined that a conference call is active, such as between a conference bridge service, utilizing a conference bridge leader, and one or more mobile communications devices in a wireless communications network. At step 512, a mute request is received from a conference bridge service, the mute request indicating that it would like to mute some or all of the mobile communications devices participating on the conference call. This mute request may be received in an existing voice link that has been established between a BSC in the wireless communications network and the conference bridge service A base transceiver station associated with each of the mobile communications devices on the conference call is identified at step 514 such that multiple BTSs may be identified at this step if there are mobile devices associated with different BTSs. To identify the BTS(s), an identification associated with the mobile devices is used, which, in one embodiment, is a telephone number. At step 516, it is requested that the mobile devices stop transmitting data over a traffic portion of the reverse link, which extends from the mobile device through the wireless communications network. While data is stopped from being transmitted over the traffic portion, the mobile devices may continue to transmit signaling information over the signaling portion of the reverse link. Signaling information may include, for example, messages to handover a call to a different BTS, messages regarding the quality of the forward link, or messages notifying the wireless communications network to power up or power down. An unmute request is received at step 518. The unmute request may specifically identify those mobile devices that are to be unmuted, or may request that all participants are unmuted. While in one embodiment the unmute request is received from the conference bridge server, in another embodiment, the unmute request is received from one of the mobile communications devices. If received from a mobile device, that mobile device only may resume transmitting data over the traffic portion of the reverse link. In one instance, the mobile device is first sent a confirmation message to confirm that the user does wish to unmute the line, such as to ask a question, make a comment, or the like. At step 520, it is requested that the mobile devices resume transmitting the traffic portion of the reverse link. In one instance, the BSC communicates this request to the BTSs associated with the mobile devices, as the BTSs are the components that actually communicate this notification to the devices.

As previously mentioned, the BSC, once it has received the mute request, may alter a timer associated with the reverse link such that mobile devices are not disconnected from the conference call when the wireless communications network detects that data is not being transmitted over the reverse link, as it normally would. Similarly, once the unmute request is received, the timer associated with the reverse link is once again altered so that the mobile device is disconnected from the conference call if the wireless communications network detects that the data is not being transmitted over the reverse link for a predetermined amount of time.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. Non-transitory computer-readable media having computer-executable instructions embodied thereon that, when executed, perform a method for reducing the use of network resources during a conference call, the method comprising:
   detecting that a conference bridge service is currently active between a conference bridge leader and one or more participants who access the conference bridge service by way of mobile communications devices in a wireless communications network;
   receiving an indication that the conference bridge leader has activated a mute function for each of the one or more participants on the conference call;
   at the wireless communications network, notifying each of the mobile communications devices associated with the one or more participants to stop transmitting data over a reverse link other than the data used for signaling purposes for a period of time that extends until the mute function is deactivated; and
   altering a timer associated with the reverse link such that the one or more participants on the conference call are not disconnected from the conference call when the wireless communications network detects that the data is not being transmitted over the reverse link for a predetermined amount of time.

2. The computer-readable media of claim 1, wherein the mute function is deactivated by one of the mobile communications devices for that mobile communications device only.

3. The computer-readable media of claim 1, wherein the mute function is deactivated by the conference bridge leader.

4. The computer-readable media of claim 1, wherein the data that the one or more communications devices stop transmitting is a traffic portion of the reverse link such that blank frames are not transmitted over the reverse link.

5. The computer-readable media of claim 1, further comprising detecting that the data other than the data used for signaling purposes is being transmitted over the reverse link from one of the mobile communications devices, thus indicating an unmute action initiated by the one of the mobile communications devices.

6. The computer-readable media of claim 5, further comprising sending the one of the mobile communications devices a confirmation message confirming the unmute action.

7. The computer-readable media of claim 1, further comprising:
   receiving an indication that the conference bridge leader has activated an unmute function for each of the participants on the conference call; and
   in response to the unmute function being activated, notifying the mobile communications devices to resume transmitting the traffic portion of the reverse link.

8. Non-transitory computer readable media having computer-executable instructions embodied thereon that, when executed, perform a method for reducing the use of network resources during a conference call, the method comprising:
   determining that the conference call is currently active between a conference bridge service and one or more mobile communications devices in a wireless communications network;
   in an existing voice link between a base station controller in the wireless communications network and the conference bridge service, receiving a mute request from the conference bridge service to mute the one or more mobile communications devices participating on the conference call;
   using an identification associated with each of the one or more mobile communications devices, identifying a base transceiver station associated with the each of the one or more mobile communications devices;
   at a network component, requesting that each of the base transceiver stations notify the associated one or more mobile communications devices to stop transmitting a traffic portion of a reverse link from the one or more mobile communications devices to the wireless communications network but continue transmitting a signaling portion of the reverse link to save network resources;
   altering a timer associated with the reverse link between the wireless communications network and the one or more mobile communications devices such that the one or more mobile communications devices are not disconnected from the conference call when the wireless communications network detects that data is not being transmitted over the reverse link for a predetermined amount of time;
   receiving an unmute request with respect to the one or more mobile communications devices; and in response to the unmute request, requesting that the base transceiver stations notify their associated one or more mobile communications devices to resume transmitting the traffic portion of the reverse link.

9. The computer-readable media of claim 8, wherein the unmute request is received from the conference bridge service.

10. The computer-readable media of claim 8, wherein the unmute request is received from one of the one or more mobile communications devices.

11. The computer-readable media of claim 8, wherein the signaling portion of the reverse link includes one or more of messages to handover a call to a different base transceiver station, messages regarding a quality of a forward link, or messages notifying the wireless communications network to power up or power down.

12. The computer-readable media of claim 10, wherein only the one of the one or more mobile communications devices resumes transmitting the traffic portion of the reverse link when it initiates the unmute request.

13. The computer-readable media of claim 8, wherein further in response to the unmute request, altering the timer associated with the reverse link such that the one or more mobile communications devices are disconnected from the conference call when the wireless communications network detects that the data is not being transmitted over the reverse link for a predetermined amount of time.

14. The computer-readable media of claim 13, wherein the data is transmitted on the traffic portion of the reverse link.

15. A system for reducing the use of network resources during a conference call, the system comprising:
  a base station controller that receives a mute request from a conference bridge service in relation to the conference call between a conference leader and one or more mobile communications devices, the mute request requesting that each of the one or more mobile communications devices not provide any audio to the conference call, wherein the base station controller alters a timer associated with a reverse link between a wireless communications network and the one or more mobile communications devices such that the conference call is not terminated when the wireless communications network detects that data is not being transmitted over the reverse link; at least one base transceiver station that receives the mute request from the base station controller and notifies at least one of the one or more mobile communications devices with which it is associated to stop transmitting a traffic portion of a reverse link from the at least one of the one or more mobile communications devices to the wireless communications network but continue transmitting a signaling portion of the reverse link to save network resources; and
  one or more mobile communications devices that, upon receiving a notification from the associated base transceiver station to stop transmitting the traffic portion of the reverse link, refrain from transmitting any data associated with the traffic portion of the reverse link but continue transmitting a signaling portion of the reverse link until the associated base transceiver station provides a notification to resume transmitting the traffic portion of the reverse link.

16. The system of claim 15, wherein the base station controller further identifies a base transceiver station associated with the each of the one or more mobile communications devices to which the mute request is to be sent.

17. The system of claim 15, wherein the at least one base transceiver station receives an unmute request from the base station controller upon the base station controller receiving the unmute request from the conference bridge service, thus indicating that the one or more mobile communications devices are to resume transmitting the traffic portion of the reverse link.

18. The computer-readable media of claim 15, wherein the base station controller, along with the mute request, receives from the conference bridge service a list of identifications associated with the one or more mobile communications devices that are participating in the conference call.

* * * * *